US010871395B2

(12) United States Patent
Nesbitt et al.

(10) Patent No.: US 10,871,395 B2
(45) Date of Patent: Dec. 22, 2020

(54) FILTER ASSEMBLY FOR PROVIDING ADJUSTABLE SPECTRAL CAPABILITIES IN A BROADBAND INSPECTION SYSTEM

(71) Applicant: KLA-Tencor Corporation, Milpitas, CA (US)

(72) Inventors: Jeremy Nesbitt, San Jose, CA (US); Jagadeesh Kumar, Milpitas, CA (US); David C. Oram, Fremont, CA (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 15/649,388

(22) Filed: Jul. 13, 2017

(65) Prior Publication Data

US 2018/0299324 A1 Oct. 18, 2018

Related U.S. Application Data

(60) Provisional application No. 62/485,505, filed on Apr. 14, 2017.

(51) Int. Cl.
*G01J 3/02* (2006.01)
*G01J 3/32* (2006.01)
*G01J 3/12* (2006.01)
*G01J 3/18* (2006.01)

(52) U.S. Cl.
CPC ........... *G01J 3/0235* (2013.01); *G01J 3/0202* (2013.01); *G01J 3/0291* (2013.01); *G01J 3/12* (2013.01); *G01J 3/18* (2013.01); *G01J 3/32* (2013.01); *G01J 2003/1213* (2013.01); *G01J 2003/1217* (2013.01); *G01J 2003/1221* (2013.01)

(58) Field of Classification Search
CPC ....... G01J 2003/1217; G01J 2003/1221; G01J 3/0235
See application file for complete search history.

(56) References Cited

U.S. PATENT DOCUMENTS

| 5,534,694 A * | 7/1996 | Ball ........................ G01J 1/26 250/330 |
| 5,805,278 A | 9/1998 | Danko |
| 6,621,570 B1 | 9/2003 | Danko |
| 6,702,302 B2 | 3/2004 | Smedt et al. |
| 7,092,082 B1 | 8/2006 | Dardzinski |
| 2002/0021569 A1 | 2/2002 | Beliveau |

(Continued)

FOREIGN PATENT DOCUMENTS

KR    1020170036184 A    4/2017

OTHER PUBLICATIONS

International Search Report and Written Opinion dated Jul. 30, 2018 for PCT/US2018/027209.

*Primary Examiner* — Shawn Decenzo
(74) *Attorney, Agent, or Firm* — Suiter Swantz pc llo

(57) ABSTRACT

A system which may be used to increase the number of available spectrum bands in an inspection system is provided. The system may include an illumination source configured to emit broadband illumination. The system may also include a filter assembly including two or more filter units. The two or more filter units may include two or more filters with one or more varying filtering characteristics. The system may also include two or more motors configured to selectively actuate selected filters of the filter units into the beam of illumination. Using the system, the number of available spectrum bands to be used in an inspection system may be increased.

23 Claims, 13 Drawing Sheets

(56) References Cited

U.S. PATENT DOCUMENTS

| | | | |
|---|---|---|---|
| 2007/0121106 A1* | 5/2007 | Shibata | G01N 21/8806 |
| | | | 356/237.2 |
| 2010/0208267 A1* | 8/2010 | Rogers | G01N 21/3504 |
| | | | 356/432 |
| 2012/0243770 A1 | 9/2012 | Kaneko et al. | |
| 2012/0287412 A1 | 11/2012 | Sakamoto | |
| 2013/0242382 A1* | 9/2013 | Komuro | G02B 21/365 |
| | | | 359/363 |
| 2014/0347461 A1 | 11/2014 | Kleppe et al. | |
| 2018/0052099 A1* | 2/2018 | Hill | G01J 1/4257 |

* cited by examiner

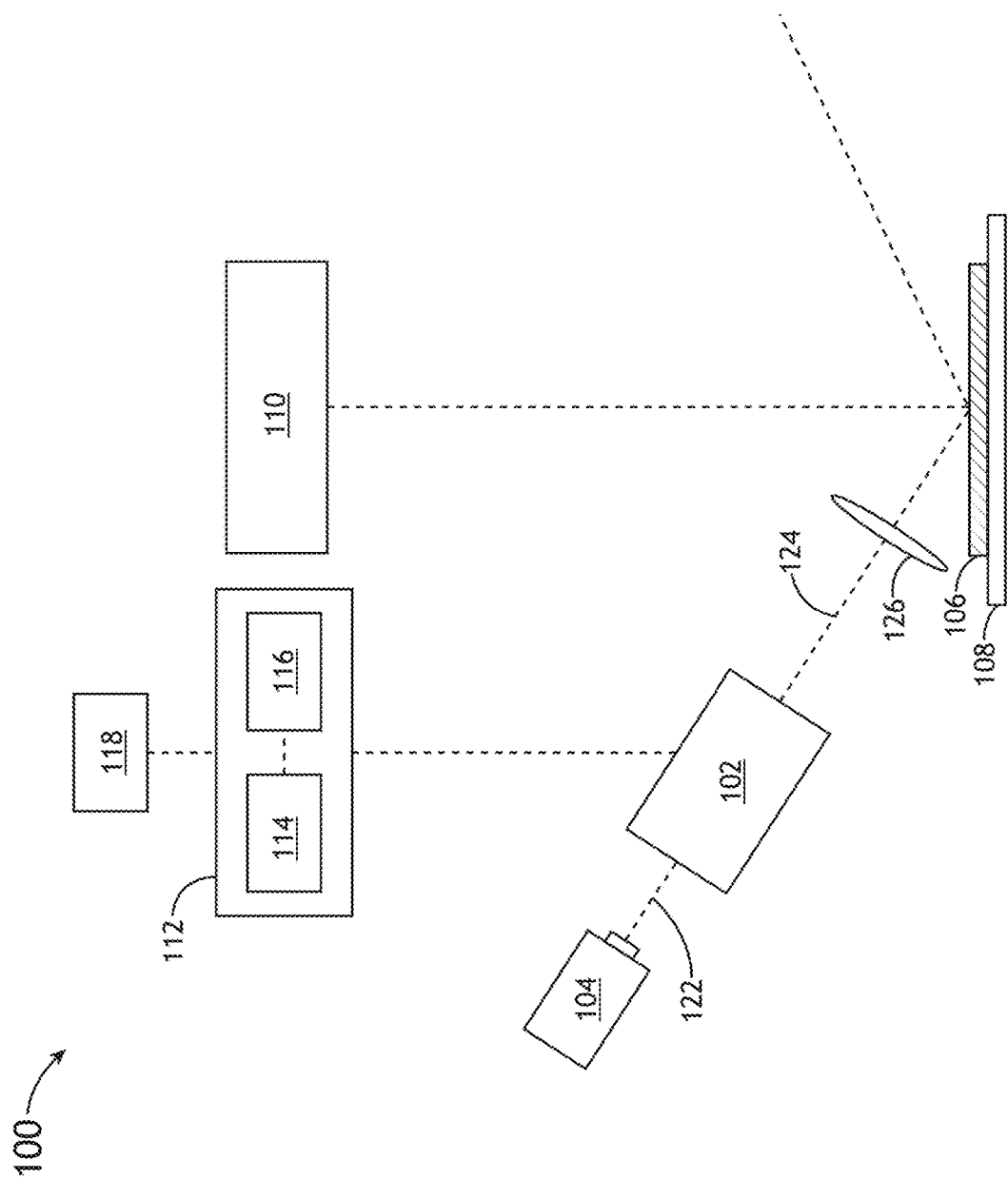

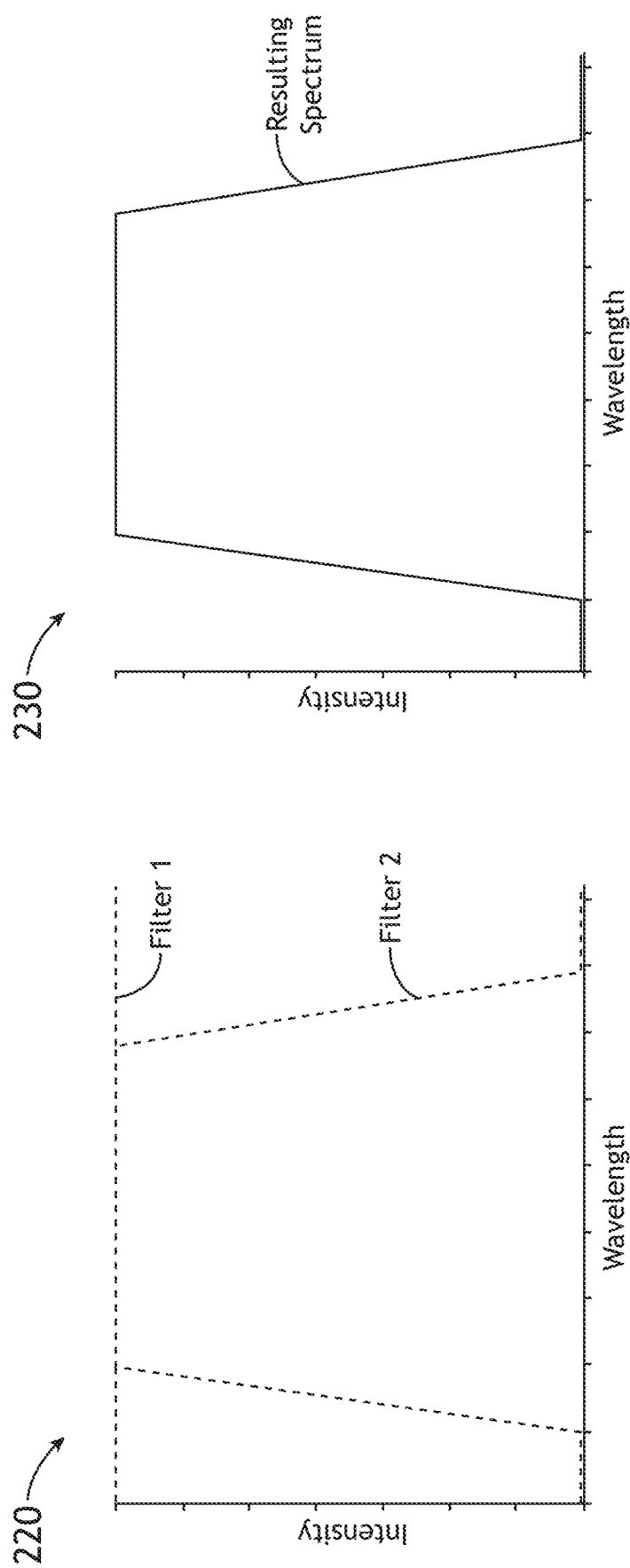

FILTER ASSEMBLY FOR PROVIDING ADJUSTABLE SPECTRAL CAPABILITIES IN A BROADBAND INSPECTION SYSTEM

CROSS-REFERENCE TO RELATED APPLICATION

The present application claims the benefit under 35 U.S.C. § 119(e) of U.S. Provisional Application Ser. No. 62/485,505, filed Apr. 14, 2017, entitled FLEXIBLE SPECTRUM FOR BROAD BAND PLASMA WAFER INSPECTION SYSTEMS, naming Jeremy Nesbitt, Jagadeesh Kumar, and David C. Oram as inventors, which is incorporated herein by reference in the entirety.

TECHNICAL FIELD

The disclosure generally relates to the field of sample inspection and defect detection, and, more particularly, to an inspection system equipped with a filter assembly for providing adjustable spectral capabilities in a broadband inspection system.

BACKGROUND

As the demand for integrated circuits having ever-smaller device features continues to increase, the need for improved inspection systems for inspection of these ever-shrinking devices continues to grow. Some inspection systems incorporate broadband light sources, such as, but not limited to, a laser-sustained plasma (LSP) broadband light source.

While inspecting a sample, such as a semiconductor wafer, various types of defects produce different signal responses based on the wavelength used during inspection. As a result, in many cases, a particular type of defect may be inspected most efficiently using a specific spectral band. Current wafer inspection systems utilize a single wheel containing various band pass spectral filters. The wheel may be rotated such that a single band pass filter may be placed in the beam of illumination, thereby filtering the light used for inspection to the spectral range associated with that filter. One drawback of current systems is that, due to space constraints, the wheels are only able to hold approximately ten separate filters at any one time. Another drawback of current systems is that a separate filter design is needed for each separate spectral range desired. The need for many spectral ranges, and therefore the need for many filters, increases cost and the time required to switch between various spectral ranges. Additionally, simply increasing the size of the wheel to accommodate additional filters may not be possible due to space constraints. Therefore, there exists a need for a system and method which cure one or more of the shortcomings of the previous approaches identified above.

SUMMARY

A filter apparatus for providing adjustable spectral capabilities in a broadband inspection system is disclosed, in accordance with one or more illustrative embodiments of the present disclosure. In one embodiment, the filter apparatus includes a first filter unit. In another embodiment, the first filter unit includes a first set of filters. In another embodiment, the filter apparatus includes a second filter unit. In another embodiment, the second filter unit includes a second set of filters. In another embodiment, at least one of the first set of filters or the second set of filters includes a first filter and a second filter having one or more filtering characteristics different from the first filter. In another embodiment, the filter apparatus includes a first motor coupled to the first filter unit. In another embodiment, the first motor is configured to selectively actuate a selected filter of the first filter unit into a beam of broadband illumination from an illumination source. Similarly, in another embodiment, the filter apparatus includes a second motor coupled to the second filter unit. In another embodiment, the second motor is configured to selectively actuate a selected filter of the second filter unit into the beam of broadband illumination from an illumination source.

A system for providing adjustable spectral capabilities in a broadband inspection system is disclosed, in accordance with one or more illustrative embodiments of the present disclosure. In one embodiment, the system includes an illumination source configured to generate broadband illumination. In another embodiment, the system includes a filter assembly. In one embodiment, the filter assembly includes a first filter unit. In another embodiment, the first filter unit includes a first set of filters. In another embodiment, the filter assembly includes a second filter unit. In another embodiment, the second filter unit includes a second set of filters. In another embodiment, at least one of the first set of filters or the second set of filters includes a first filter and a second filter having one or more filtering characteristics different from the first filter.

In another embodiment, the filter assembly includes a first motor coupled to the first filter unit. In another embodiment, the first motor is configured to selectively actuate a selected filter of the first filter unit into a beam of broadband illumination. In another embodiment, the filter assembly includes a second motor coupled to the second filter unit. In another embodiment, the second motor is configured to selectively actuate a selected filter of the second filter unit into the beam of broadband illumination.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention, and, together with the general description, serve to explain the principles of the invention.

BRIEF DESCRIPTION OF THE DRAWINGS

The numerous advantages of the disclosure may be better understood by those skilled in the art by reference to the accompanying figures in which:

FIG. 1B illustrates a simplified schematic diagram of a system for providing adjustable spectral capabilities in a broadband inspection system in a dark field configuration, in accordance with one or more embodiments of the present disclosure.

FIG. 2C illustrates a graph of intensity as a function of wavelength of a broadband output as a function of wavelength after filtering with a first filter and a second filter, in accordance with one or more embodiments of the present disclosure.

FIG. 2D illustrates a graph of intensity as a function of wavelength of a resulting broad spectral band, in accordance with one or more embodiments of the present disclosure.

DETAILED DESCRIPTION

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and, together with the general description, serve to explain the principles of the invention.

Reference will now be made in detail to the subject matter disclosed, which is illustrated in the accompanying drawings.

Referring generally to FIGS. 1A through 3D, an apparatus and system for providing adjustable spectral capabilities in a broadband inspection system are described, in accordance with one or more embodiments of the present disclosure.

Embodiments of the present disclosure are directed to a filter assembly for providing adjustable spectral capabilities in a broadband inspection system. Embodiments of the present disclosure are directed to a filter assembly including two or more filter units, wherein each filter unit includes multiple filters. The utilization of the filter assembly of the present disclosure causes broadband illumination emitted from an illumination source to be filtered at least twice: first by a first filter on a first filter unit, then by a second filter on a second filter unit. The resulting filtered spectrum, which may be used for sample inspection, would therefore be a product of the two or more filters. Such a configuration allows broadband light to be more flexibly filtered to a desired spectral range. It is noted herein that the increased number of filter configuration combinations allows a user increased flexibility to modify the characteristics of a beam of broadband illumination to be used for inspection. It is further noted herein that the implementation of a filter assembly including two or more separate filter units serves to decrease cost, increase the number of available spectral bands, and alleviate space constraints.

While much of the present disclosure focuses on the implementation of the embodiments of the present disclosure in the context of semiconductor wafer inspection, this is not a limitation on the present disclosure and is provided merely for illustrative purposes. It is noted herein that the embodiments of the present disclosure may be extended to any inspection or imaging setting known in the optical arts, including, but not limited to, semiconductor device inspection, reticle inspection, biological specimen inspection, and the like.

Figure 1A:
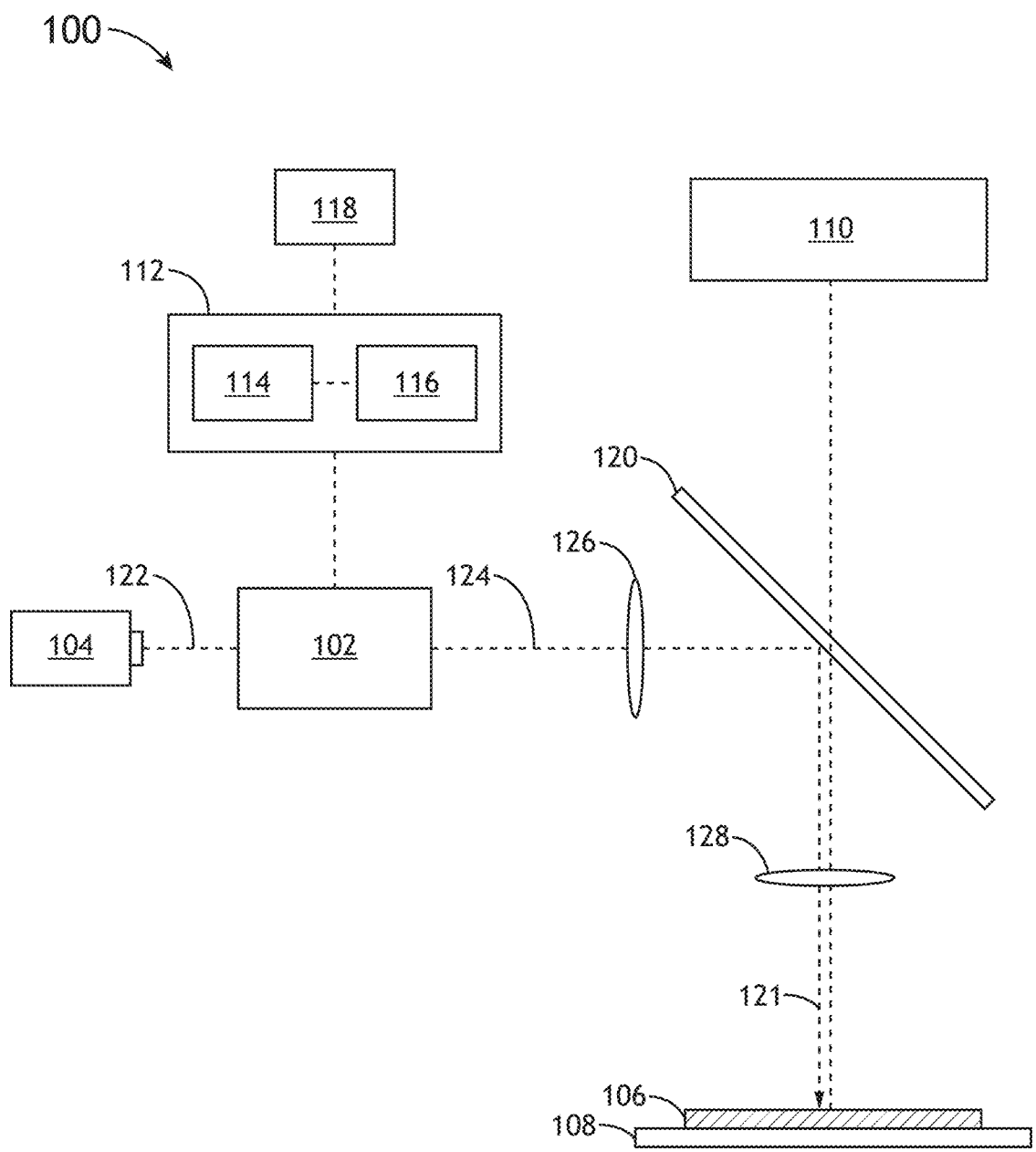
FIG. 1A illustrates a block diagram of a system for providing adjustable spectral capabilities in a broadband inspection system in a bright field configuration, in accordance with one or more embodiments of the present disclosure.

FIG. 1A illustrates a block diagram of a system for providing adjustable spectral capabilities in a broadband inspection system in a bright field configuration, in accordance with one or more embodiments of the present disclosure.

In one embodiment, the system 100 includes a filter assembly 102, an illumination source 104, a sample stage 108, a detector 110, and/or a controller 112.

In one embodiment, the illumination source 104 is configured to emit broadband illumination 122 which may be used to illuminate a portion of a sample 106 secured by the sample stage 108. The illumination source 104 may include any illumination source known in the art of sample inspection. For example, the illumination source 104 may include, but is not limited to, a laser produced plasma (LPP) broadband source, a discharge broadband source, or a broadband laser. Further, the illumination source 104 may illuminate a portion of the sample 106 with illumination of any spectral range known in the art of sample inspection. For example, the illumination source 104 may emit illumination in the infrared (IR), visible, ultra-violet (UV), or deep ultra-violet (DUV) spectral ranges.

The sample 106 may include, but is not limited to, a wafer, such as a semiconductor wafer (e.g., silicon wafer). The sample stage 108 may be configured to move or rotate the sample, using any actuation method known in the art, in order to facilitate inspection of the sample 106.

It is noted that the system 100 of the present disclosure may be configured as any inspection system known in the art. For example, as shown in FIG. 1A, the system 100 may be configured as a bright field (BF) inspection system. Alternatively, as shown in FIG. 1B, the system 100 may be configured as a dark field (DF) inspection system. Applicant notes that the optical configurations depicted in FIGS. 1A and 1B are provided merely for illustrative purposes and should not be interpreted as limiting. In a general sense, the system 100 of the present disclosure may include any set of imaging and optical elements suitable for imaging the surface of a sample 106. Examples of wafer inspection tools are described in detail in U.S. Pat. Nos. 7,092,082, 6,702,302, 6,621,570, and 5,805,278, which are each herein incorporated by reference.

Referring again to FIG. 1A, in one embodiment, the filter assembly 102 is configured to receive broadband illumination 122 emitted from the illumination source 104 and filter the broadband illumination 122 into a filtered spectrum 124. In another embodiment, the illumination having the filtered spectrum 124 may be directed to the surface of a sample 106.

In another embodiment, the system 100 may include one or more illumination optics 126, 128 for directing and/or focusing the illumination emitted by illumination source 104 onto a portion of the sample 106. The illumination optics 126, 128 may include any optical elements known in the art. For example, the illumination optics 126, 128 may include, but are not limited to, one or more diffractive optical elements, one or more lenses, one or more mirrors, one or more filters, and the like. In another embodiment, the system 100 includes one or more beam splitters 120 for directing the illumination emitted by illumination source 104 onto a portion of the sample 106.

In one embodiment, the one or more detectors 110 are configured to collect illumination from the surface of sample 106 (e.g. illumination scattered from one or more defects, illumination reflected from the surface of sample 106, and the like). The detectors 110 may include any detector(s) known in the art of sample inspection. For example, detectors 110 may include, but are not limited to, CCD detectors or TDI-CCD detectors.

In another embodiment, the controller 112 includes one or more processors 114. In another embodiment, the one or more processors 114 are configured to execute a set of program instructions stored in memory 116. In another embodiment, the set of program instructions are configured to cause one or more components of the filter assembly 102 to actuate in order to selectively alter one or more characteristics of the filtered spectrum 124. In another embodiment, the system 100 includes a user interface 118 communicatively coupled with the controller 112.

The one or more processors 114 of controller 112 may include any one or more processing elements known in the art. In this sense, the one or more processors 114 may include any microprocessor-type device configured to execute software algorithms and/or instructions. In one embodiment, the one or more processors 114 may consist of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. In general, the term "processor" may be broadly defined to encompass any device having one or more processing elements, which execute program instructions from memory 116. Moreover, different subsystems of the system 100 (e.g., filter assembly 102, or user interface 118) may include processor or logic elements suitable for carrying out at least a portion of the steps described throughout the present disclosure. Therefore, the above description should not be interpreted as a limitation on the present disclosure but merely an illustration.

The memory 116 may include any storage medium known in the art suitable for storing program instructions executable by the associated one or more processors 114. For example, the memory 116 may include a non-transitory memory medium. For instance, the memory 116 may include, but is not limited to, a read-only memory, a random access memory, a magnetic or optical memory device (e.g., disk), a magnetic tape, a solid state drive, and the like. In another embodiment, the memory 116 is configured to store one or more results from the filter assembly 102, the detectors 110, and/or the output of the various steps described herein. It is further noted that memory 116 may be housed in a common controller housing with the one or more processors 114. In an alternative embodiment, the memory 116 may be located remotely with respect to the physical location of the processors and controller 112 For instance, the one or more processors 114 of controller 112 may access a remote memory (e.g., server), accessible through a network (e.g., internet, intranet, and the like). In another embodiment, the memory 116 maintains program instructions for causing the one or more processors 114 to carry out the various steps described through the present disclosure.

In one embodiment, the user interface 118 is communicatively coupled to the controller 112. The user interface 118 may include any user input device known in the art. For example, the user input device may include, but is not limited to, a keyboard, a keypad, a touchscreen, a scroll bar, a steering wheel, a joystick, or the like. Those skilled in the art should recognize that a large number of user input devices may be suitable for implementation in the present invention, and that the present invention is not limited to those user input devices listed herein.

In other embodiments, the user interface 118 includes a display used to display data of the system 100 or the filter assembly 102 to the user. The display of the user interface 118 may include any display known in the art. For example, the display may include, but is not limited to, a liquid crystal display (LCD), an organic light-emitting diode (OLED) based display or a CRT display. Those skilled in the art should recognize that any display device capable of integration with a user interface 118 is suitable for implementation in the present disclosure. In another embodiment, a user may input selections and/or instructions responsive to data displayed to the user via the user interface 118.

Figure 1C:
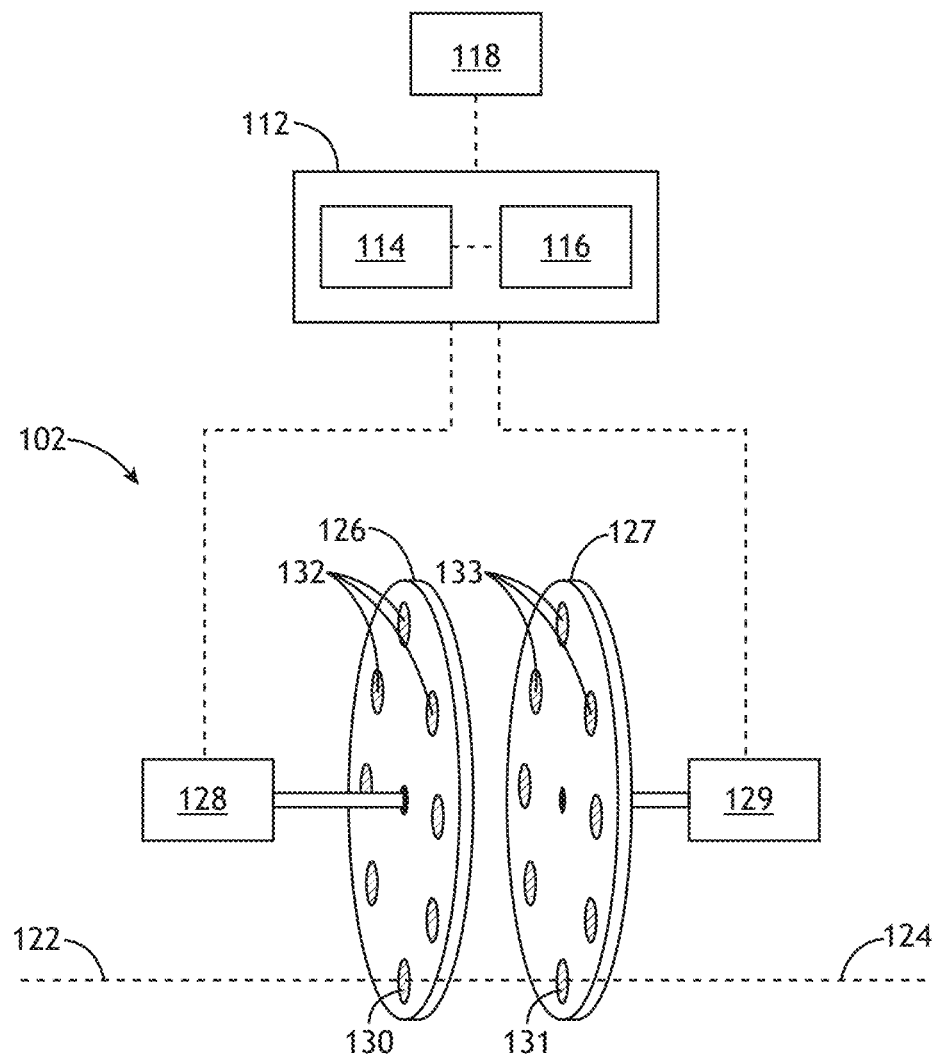
FIG. 1C illustrates a simplified conceptual diagram of a filter wheel assembly for providing adjustable spectral capabilities in a broadband inspection system, in accordance with one or more embodiments of the present disclosure.

FIG. 1C illustrates a simplified conceptual diagram of a filter assembly 102, in accordance with one or more embodiments of the present disclosure.

In this embodiment, the filter assembly 102 is a filter wheel assembly. In one embodiment, the filter assembly 102 includes two or more filter wheels 126, 127. In one embodiment, the first filter wheel 126 includes a first set of filters 132. In another embodiment, the second filter wheel 127 includes a second set of filters 133. In another embodiment, when in operation, the filter wheel assembly may be controlled such that the first set of filters 132 includes an "active" filter 130, which is aligned within the beam of illumination 121 emitted from illumination source 104. Similarly, the second set of filters 133 may include an active filter 131, which is also aligned within the beam of illumination 121 emitted from illumination source 104.

In another embodiment, the filter assembly 102 includes two or more motors 128, 129 which are rotationally coupled to the two or more filter wheels 126, 127. In another embodiment, the motors 128, 129 are configured such that each filter wheel 126, 127 may be rotated independently with respect to the other filter wheel 126, 127. For example, a first motor 128 may be configured such that it may rotate the first filter wheel 126 independently with respect to the second filter wheel 127. By way of another example, a second motor 129 may be configured such that it may rotate the second filter wheel 127 independently with respect to the first filter wheel 126.

In one embodiment, the first filter wheel 126 may include a first set of filters 132. In another embodiment, the second filter wheel 127 may include a second set of filters 133. In another embodiment, the first set of filters 132 includes a first filter and a second filter such that the first and second filters have one or more different filtering characteristics. In another embodiment, the second set of filters 133 includes a first filter and a second filter such that the first and second filters have one or more different filtering characteristics.

In another embodiment, motors 128, 129 may be configured to selectively rotate the filter wheels 126, 127 such that a selected filter of each set of filters 132, 133 is rotated into the beam of illumination. For example, the first motor 128 may be controlled to selectively rotate the first filter wheel 126 independently of the second filter wheel 127 such that a selected filter of the first set of filters 132 is rotated into the beam of illumination 121 from illumination source 104. By way of another example, the second motor 129 may be controlled to selectively rotate the second filter wheel 127 independently of the first filter wheel 126 such that a selected filter of the second set of filters 133 is rotated into the beam of illumination 121 from illumination source 104.

It is noted that the independent rotation of filter wheels 126, 127 allows for many filter combinations among sets of filters 132, 133. For example, a first wheel configured to rotate independently with respect to a second wheel may include n unique individual filters. The second wheel, which is configured to rotate independently with respect to the first wheel, may include m unique individual filters. In this example, the total number of unique filter combinations N may be found by the equation $N=m*n$.

Figure 1D:
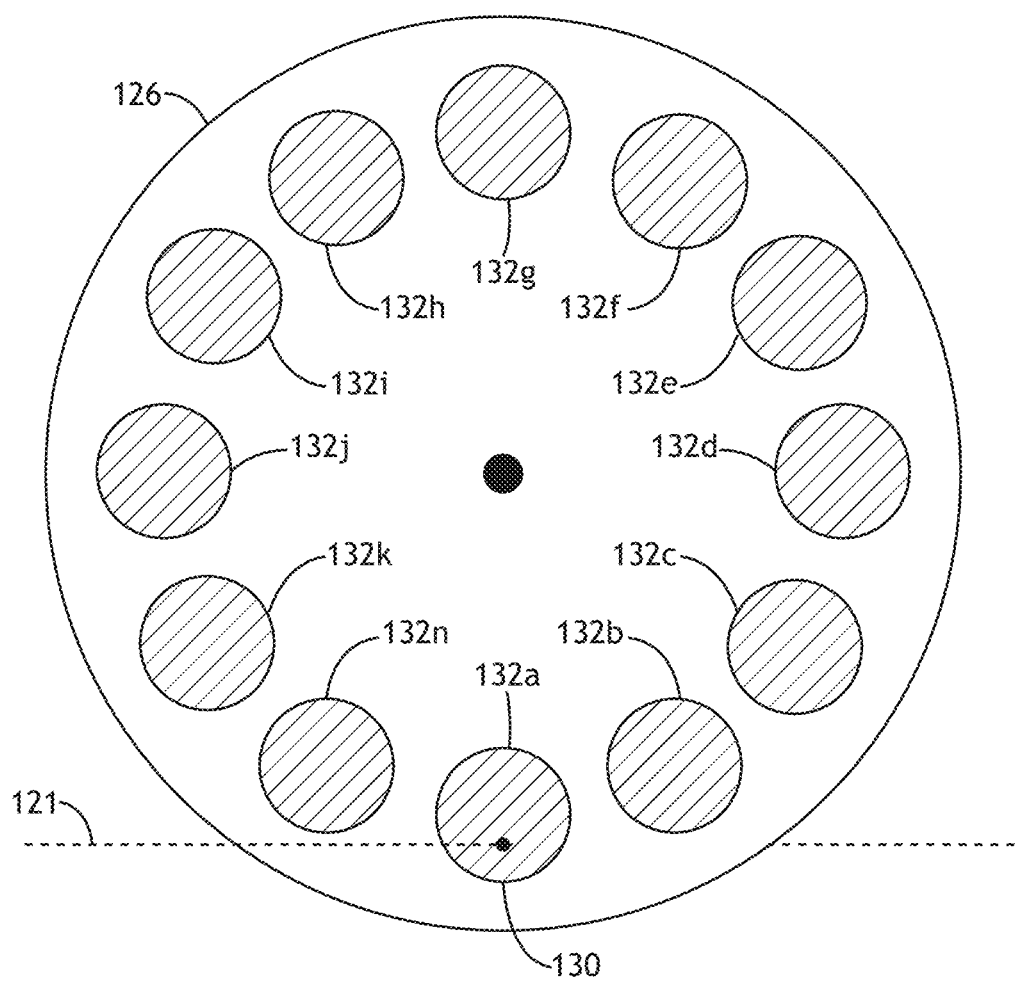
FIG. 1D illustrates a simplified schematic diagram of a wheel including a set of filters, in accordance with one or more embodiments of the present disclosure.
Figure 1E:
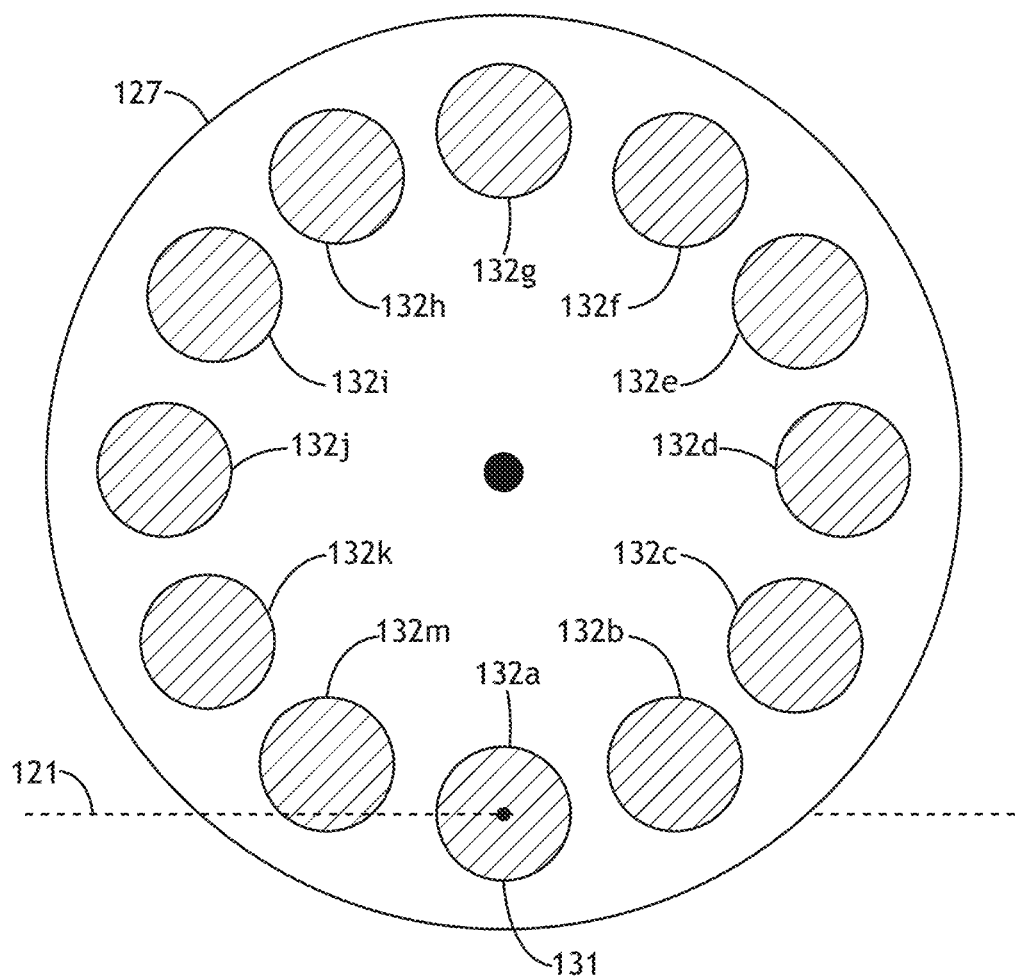
FIG. 1E illustrates a simplified schematic diagram of a wheel including a set of filters, in accordance with one or more embodiments of the present disclosure.

FIGS. 1D and 1E illustrate simplified schematic diagrams of filter wheels 126, 127 including sets of filters 132 and 133, in accordance with one or more embodiments of the present disclosure. As previously discussed, the first filter wheel 126 and the second filter wheel 127 may be configured to rotate independently with respect to each other. In this example, the first filter wheel 126 has 12 individual filters (i.e., n=12) and the second filter wheel 127 has 12 individual filters (i.e., m=12). In this example, filter wheels 126 and 127 are able to produce 144 unique filter combinations (i.e., $N=12*12=144$). It is contemplated that additional wheels including additional sets of filters may be utilized to further modify one or more characteristics of broadband illumination 122, which may produce additional unique filter combinations.

In another embodiment, sets of filters 132, 133 may include filters configured to transmit an output spectral range between approximately 10 nm to 600 nm. In another embodiment, sets of filters 132, 133 may each include 5-25 individual filters. For instance, sets of filters 132, 133 may include 12 individual filters, as depicted in FIGS. 1D and 1E. It is noted that, while filter wheels 126, 127 depicted in FIGS. 1D and 1E each have 12 individual filters, this configuration is not a limitation on the scope of the present disclosure and is provided merely for illustrative purposes.

It is contemplated herein that each filter wheel (or other filter holding mechanism) may include any number of filters.

In another embodiment, the first set of filters 132 includes a low pass filter and/or a high pass filter. In another embodiment, the second set of filters 133 includes at least one of a low pass filter or a high pass filter. In yet another embodiment, the first set of filters 132 includes one or more high pass filters, and the second set of filters 133 includes one or more low pass filters. In yet another embodiment, the first set of filters 132 includes one or more low pass filters, and the second set of filters 133 includes one or more high pass filters. In another embodiment, a set of prisms could be used in place of sets of filters in order to achieve spectral separation based on wavelength.

In another embodiment, filter wheels 126, 127 may be rotated such that one or fewer individual filters are placed in the beam of illumination 121. For example, referring to FIG. 1D, first motor 128 may selectively rotate first filter wheel 126 such that a selected filter is rotated into the beam of illumination 121. In this example, filter 132A was selectively rotated into the beam of illumination 121. Thus, in this example, filter 132A is the "active" filter 130 and filters 132B-n, which are not in the beam of illumination 121, are "inactive." In another example, referring to FIG. 1E, second motor 129 may selectively rotate second filter wheel 127 such that a selected filter is rotated into the beam of illumination 121. In this example, filter 133A is placed in the beam of illumination 121. Thus, in this example, filter 133A is the "active" filter 131 and filters 133B-m, which are not in the beam of illumination 121, are "inactive."

Referring again to FIG. 1C, in another embodiment, controller 112 is configured to cause one or more filter wheels 126, 127 of the filter assembly 102 to selectively rotate a selected filter of the sets of filters 132, 133 into the beam of illumination 121 in order to control one or more characteristics of the broadband illumination 122. For example, the characteristics and location of each individual filter of the sets of filters 132, 133 may be stored in memory 116. Using the known locations of each of the individual filters on the filter wheels 126, 127, the one or more processors 114 of controller 112 may execute a set of program instructions configured to cause the motors 128, 129 to selectively rotate filter wheels 126, 127 such that a first filter in the first set of filters 132 and/or a second filter in the second set of filters is rotated into the beam of illumination 121.

Figure 1F:
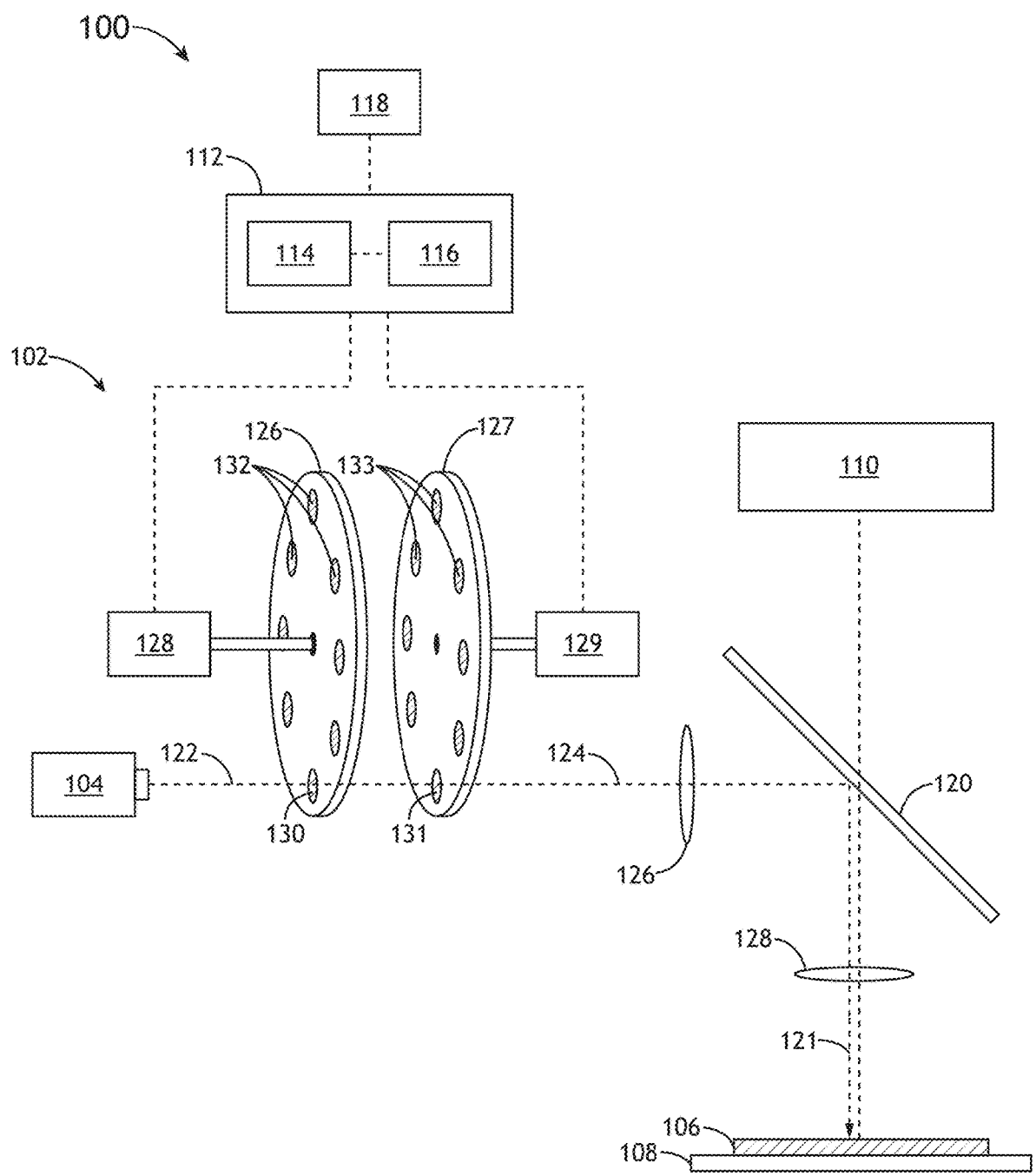
FIG. 1F illustrates a simplified conceptual diagram of a system for providing adjustable spectral capabilities in a broadband inspection system, in accordance with one or more embodiments of the present disclosure.

FIG. 1F illustrates a simplified schematic diagram of system 100 for providing adjustable spectral capabilities in a broadband inspection system, in accordance with one or more embodiments of the present disclosure.

In one embodiment, as shown in FIG. 1F, system 100 may include a filter wheel assembly, as pictured in FIG. 1C.

Figure 3A:
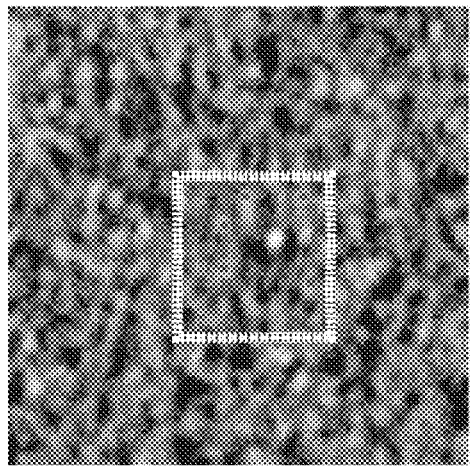
FIG. 3A illustrates an image of a defect acquired using illumination of a wavelength range 260-285 nm, in accordance with one or more embodiments of the present disclosure.
Figure 3B:
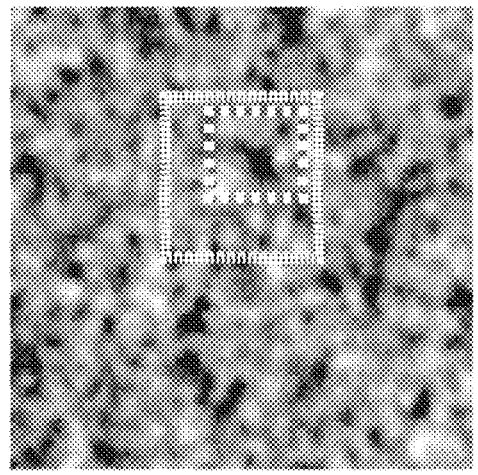
FIG. 3B illustrates an image of a defect acquired using illumination of a wavelength range 260-303 nm, in accordance with one or more embodiments of the present disclosure.
Figure 3C:
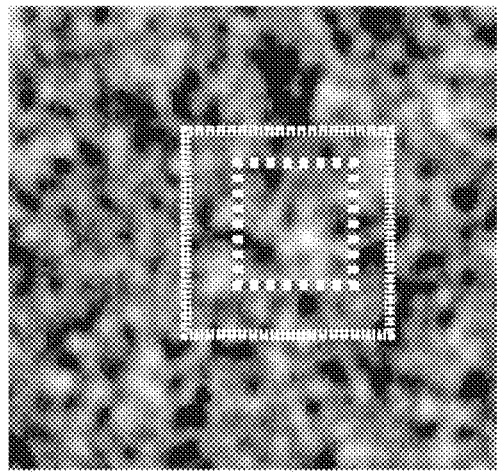
FIG. 3C illustrates an image of a defect acquired using illumination of a wavelength range 260-320 nm, in accordance with one or more embodiments of the present disclosure.
Figure 3D:
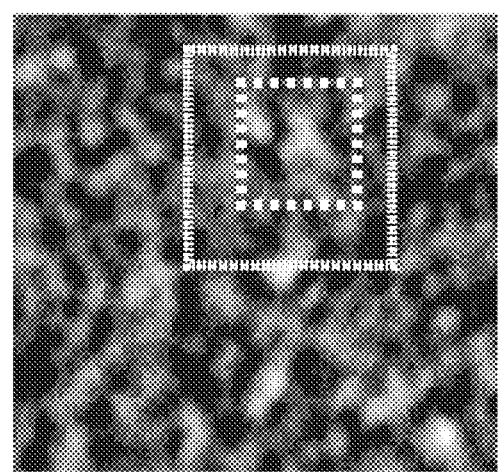
FIG. 3D illustrates an image of a defect acquired using illumination of a wavelength range 421-450 nm, in accordance with one or more embodiments of the present disclosure.

As stated herein, a single defect, or type of defect, may be examined most effectively using a particular spectral band. This tendency may be seen with reference to FIGS. 3A-3D. FIGS. 3A-3D depict images of a defect inspected using varying spectral ranges, in accordance with one embodiment of the present disclosure. FIG. 3A depicts an image of a defect inspected using illumination with a wavelength range of 260-285 nanometers. FIGS. 3B-3D depict images of the same defect inspected using illumination with ranges of 260-303, 260-320, and 421-450 nanometers, respectively. As can be seen in FIGS. 3A-3D, a single defect may produce varying responses to varying spectral bands.

Based on the tendency of defects to produce varying responses to varying spectral bands, system 100 may be used to calibrate and/or optimize an inspection system, in accordance with one or more embodiments of the present disclosure. For example, the controller 112 may direct the first motor 128 to rotate the first filter wheel 126 to selectively rotate a first selected filter of the first set of filters 132 into the beam of illumination 121. Similarly, the controller 112 may also direct the second motor 129 to rotate the second filter wheel 127 to selectively rotate a first selected filter of the second set of filters 133 into the beam of illumination 121. The combined configuration of filter wheels 126, 127 may be stored in memory 116 as a first configuration. A user may provide system 100 with a sample 106 which includes a known type of defect. System 100 may then be used inspect the surface of the sample 106 for the known defect with filter assembly 102 in the first configuration. Detectors 110 may then collect illumination scattered from the sample 106. The level of illumination collected by the detectors 110 may be associated with the first configuration. By way of example, the collected illumination associated with the first configuration may be represented by the image depicted in FIG. 3A.

Continuing with the same example, the controller 112 may cause one or more filter wheels 126, 127 to selectively rotate one or more selected filters from sets of filters 132, 133 into the beam of illumination 121. This combined orientation of filter wheels 126, 127 may be stored in memory 116 as a second configuration. Using the same sample 106 with a known type of defect as was used for the first configuration, system 100 may then be used to inspect the surface of the sample 106 using the second configuration. Detectors 110 may collect illumination scattered from the sample 106, and the level of illumination collected may be associated with the second configuration. By further way of example, the collected illumination associated with the first configuration may be represented by the image depicted in FIG. 3B.

Continuing with the same example, the process described previously may be used recursively to inspect the surface of sample 106 with every possible configuration of the filter assembly 102. The illumination collected by detectors 110 may be associated with each possible configuration. Comparing the levels of illumination collected, a user and/or one or more computers or processors (not pictured) may determine the configuration which optimizes inspection for that particular type of defect. The optimal configuration may be the configuration which maximizes the illumination collected by detectors 110. The optimal configuration for that particular type of defect may then be stored in memory 116 for future use. Furthermore, this process may be used for a wide array of possible defects. Repeating this process for a wide array of defect types would allow a user to create a list of possible defects and their corresponding optimal filter assembly 102 configurations. The list of optimal configurations for each type of defect may be stored in memory 116 for future use.

Figure 1G:
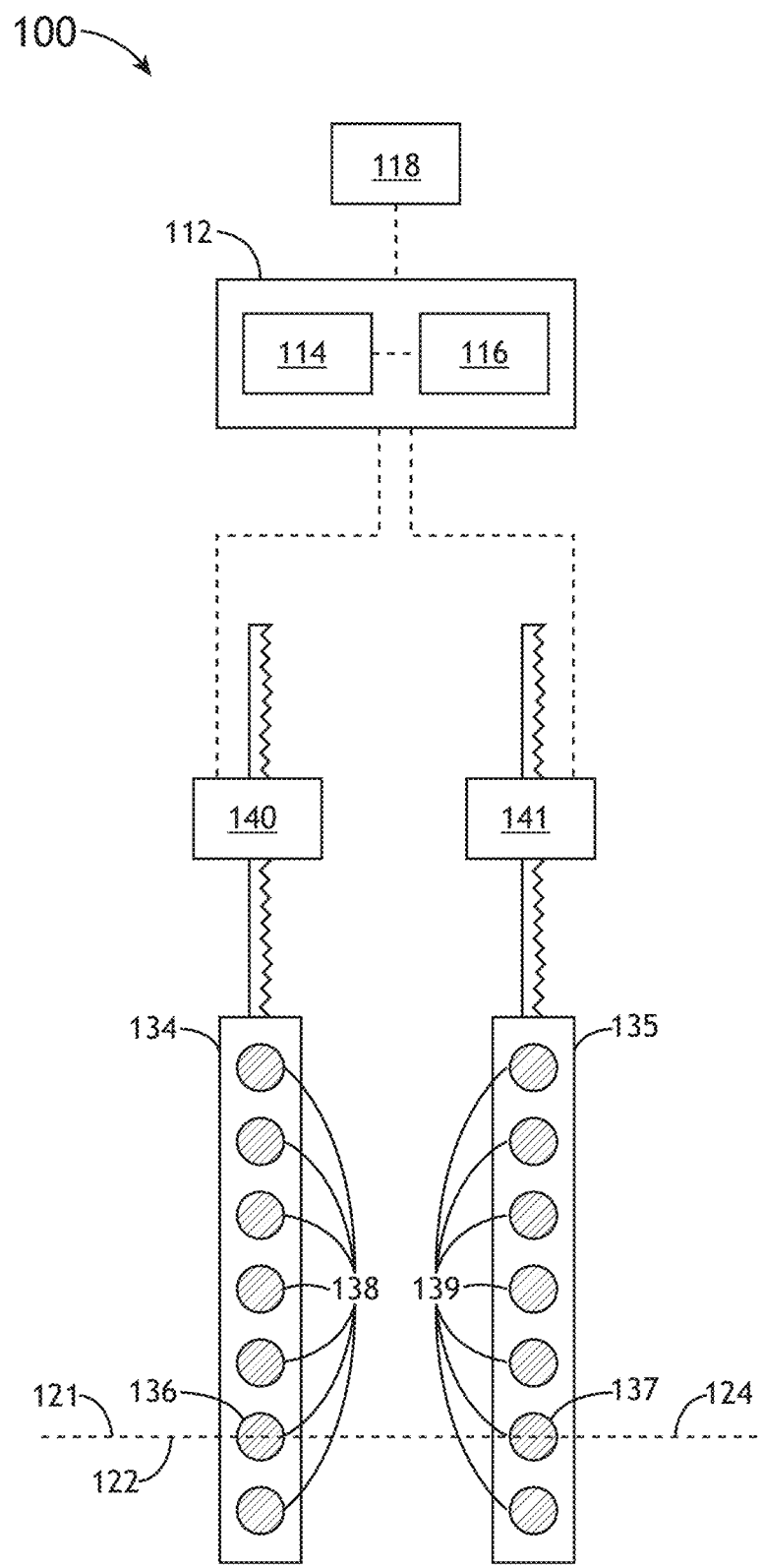
FIG. 1G illustrates a simplified schematic diagram of a filter assembly for providing adjustable spectral capabilities in a broadband inspection system, in accordance with one or more embodiments of the present disclosure.

FIG. 1G illustrates another embodiment of the present disclosure. FIG. 1G illustrates a simplified schematic diagram of a filter assembly 102 for providing adjustable spectral capabilities in a broadband inspection system, in accordance with one or more embodiments of the present disclosure. FIG. 1G depicts one possible alternative embodiment to the filter assembly 102 of system 100.

In one embodiment, filter assembly 102 is a filter slide assembly, as depicted in FIG. 1G. In one embodiment, the filter assembly 102 includes two or more sliding units 134, 135. In another embodiment, sliding units 134, 135 include sets of filters 138, 139. In another embodiment, a first set of filters 138 may include a first filter and a second filter having one or more filtering characteristics different from the first filter. Similarly, in another embodiment, a second set of filters 139 may include a first filter and a second filter having one or more filtering characteristics different from the first filter.

Figure 1H:
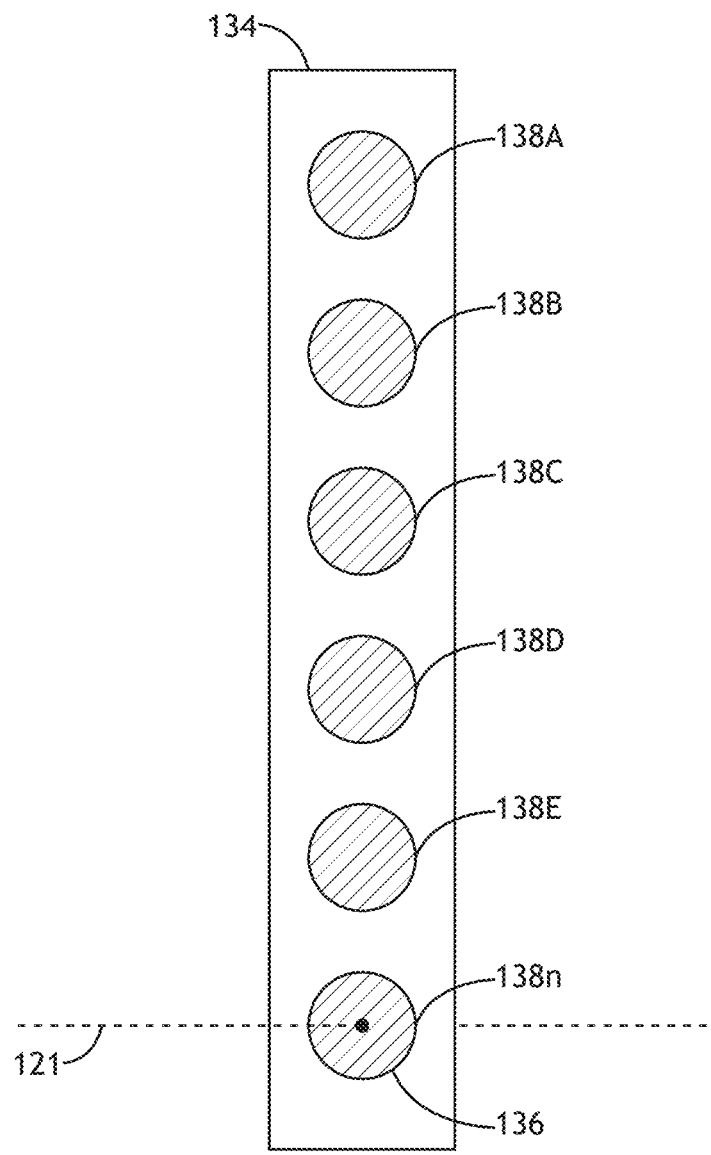
FIG. 1H illustrates a simplified schematic diagram of a sliding filter device, in accordance with one or more embodiments of the present disclosure.
Figure 1I:
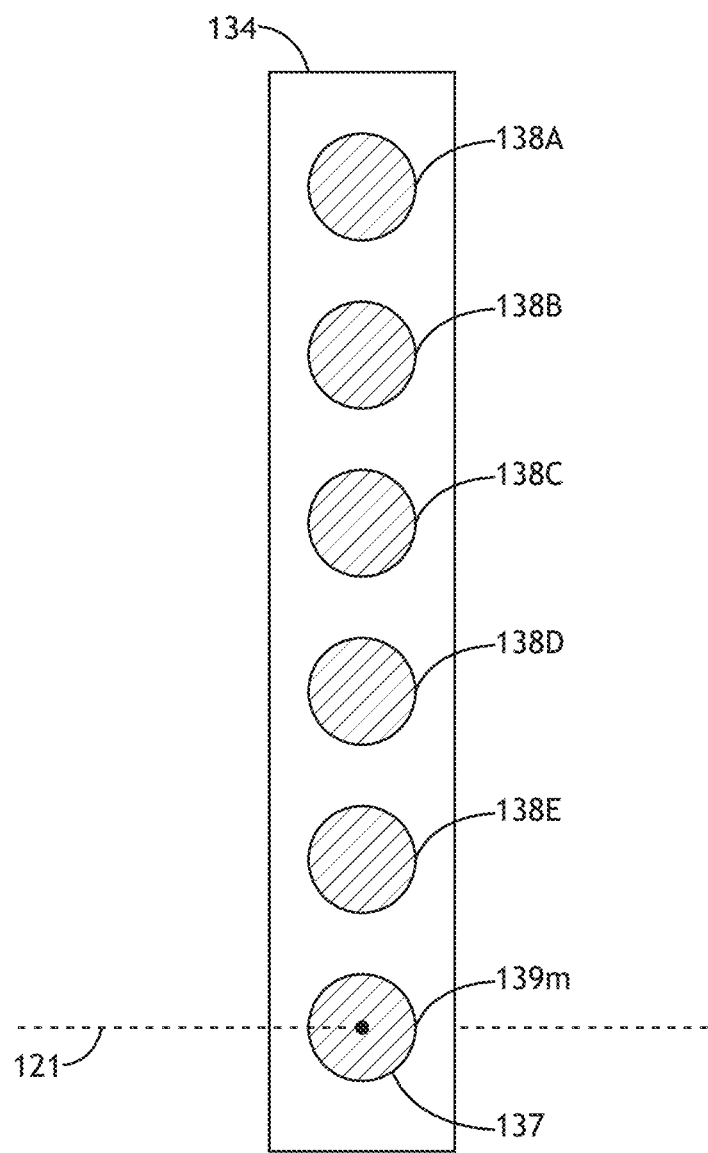
FIG. 1I illustrates a simplified schematic diagram of a sliding filter device, in accordance with one or more embodiments of the present disclosure.

In another embodiment, the sets of filters 138, 139 may include filters ranging from 10 nm to 600 nm. In one embodiment, sets of filters 138, 139 may each include 5-25 individual filters. For example, sets of filters 138, 139 on sliding units may each include 6 individual filters, as shown in FIGS. 1H and 1I. By way of another example, sets of filters 138, 139 on sliding units 134, 135 may each include 8-12 individual filters.

In another embodiment, sets of filters 138, 139 may be configured such that one or fewer individual filters are aligned with the beam of illumination 121. For example, in one embodiment, as depicted in FIG. 1G, only one filter of the first set of filters 138 may be the "active" filter 136 aligned with the beam of illumination 121. Similarly, in another embodiment, the second set of filters 139 may be configured such that only one filter of the second set of filters 139 may be the "active" filter 137 aligned with the beam of illumination 121. In another embodiment, broadband illumination 122 passes through two or more "active" filters 136, 137 located on the sliding units 134, 135 and exits the filter assembly as illumination having a filtered spectrum 124. It is contemplated that additional sliding units including additional sets of filters may be utilized to further modify one or more characteristics of broadband illumination 122.

In another embodiment, filter assembly includes two or more motors 140, 141. In another embodiment, motors 140, 141 are coupled to sliding units 134, 135. In another embodiment, motors 140, 141 are configured to actuate sliding units 134, 135. In another embodiment, motors 140, 141 are configured to selectively actuate selected filters of the sliding units 134, 135 into the beam of illumination 121. In another embodiment, motors 140, 141 are configured to selectively actuate sliding units 134, 135 independently with respect to each other. For example, a first motor 140 may be configured to selectively actuate a selected filter of a first sliding unit 134 into the beam of illumination 121 independently with respect to a second sliding unit 135. In another example, the second motor 141 may be configured to selectively actuate a selected filter of the second sliding unit 135 into the beam of illumination 121 independently with respect to first sliding unit 134.

It is noted that other possible configurations for filter assembly 102 have been contemplated. For example, in addition to the aforementioned configurations, filter assembly 102 may include, but is not limited to, a filter assembly 102 including sets of filter flaps, a filter assembly 102 including two or more sets of filters on rotating shafts, or the like.

FIGS. 1H and 1I illustrate simplified schematic diagrams of sliding units 134, 135. The sliding units 134, 135 may be configured such that one or fewer individual filters is aligned with the beam of illumination. For example, as depicted in FIG. 1H, only one individual filter is aligned with the beam of illumination 121 and is therefore the only "active" filter 136. By way of another example, as depicted in FIG. 1I, only one individual filter is aligned with the beam of illumination 121 and is therefore the only "active" filter 136.

In another embodiment of the present invention, the filter assembly 102 includes a controller 112 communicatively coupled with motors 140, 141. In another embodiment, the controller 112 includes one or more processors 114. In another embodiment, the one or more processors 114 are configured to execute a set of program instructions stored in memory 116. In another embodiment, the set of program instructions are configured to cause one or more motors 140, 141 of the filter sliding assembly to selectively actuate a selected filter of one or more sliding units 134, 135 into the beam of illumination 121.

The one or more processors 114 of controller 112 may include any one or more processing elements known in the art. In this sense, the one or more processors 114 may include any microprocessor-type device configured to execute software algorithms and/or instructions. In one embodiment, the one or more processors 114 may consist of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. In general, the term "processor" may be broadly defined to encompass any device having one or more processing elements, which execute program instructions from memory 116. Moreover, different subsystems of the system 100 (e.g., filter assembly 102, or user interface 118) may include processor or logic elements suitable for carrying out at least a portion of the steps described throughout the present disclosure. Therefore, the above description should not be interpreted as a limitation on the present disclosure but merely an illustration.

The memory 116 may include any storage medium known in the art suitable for storing program instructions executable by the associated one or more processors 114. For example, the memory 116 may include a non-transitory memory medium. For instance, the memory 116 may include, but is not limited to, a read-only memory, a random access memory, a magnetic or optical memory device (e.g., disk), a magnetic tape, a solid state drive, and the like. In another embodiment, the memory 116 is configured to store one or more results from the filter assembly 102, the detectors 110, and/or the output of the various steps described herein. It is further noted that memory 116 may be housed in a common controller housing with the one or more processors 114. In an alternative embodiment, the memory 116 may be located remotely with respect to the physical location of the processors and controller 112. For instance, the one or more processors 114 of controller 112 may access a remote memory (e.g., server), accessible through a network (e.g., internet, intranet, and the like). In another embodiment, the memory 116 maintains program instructions for causing the one or more processors 114 to carry out the various steps described through the present disclosure.

In another embodiment, the system 100 includes a user interface 118. In one embodiment, the user interface 118 is communicatively coupled to the controller 112. The user interface 118 may include any user input device known in the art. For example, the user interface 118 may include, but is not limited to, a keyboard, a keypad, a touchscreen, a scroll bar, a steering wheel, a joystick, or the like. Those skilled in the art should recognize that a large number of user input devices may be suitable for implementation in the present invention, and that the present invention is not limited to those user input devices listed within the present disclosure.

In other embodiments, the user interface 118 includes a display used to display data of the system 100 or the filter assembly 102 to the user. The display of the user interface 118 may include any display known in the art. For example, the display may include, but is not limited to, a liquid crystal display (LCD), an organic light-emitting diode (OLED) based display or a CRT display. Those skilled in the art should recognize that any display device capable of integration with a user interface 118 is suitable for implementation in the present disclosure. In another embodiment, a user may user may input selections and/or instructions responsive to data displayed to the user via the user interface 118.

FIGS. 2A-2D illustrate graphs of intensity vs. wavelength using varying filters in the present invention, in accordance with one embodiment of the present invention.

Figure 2A:
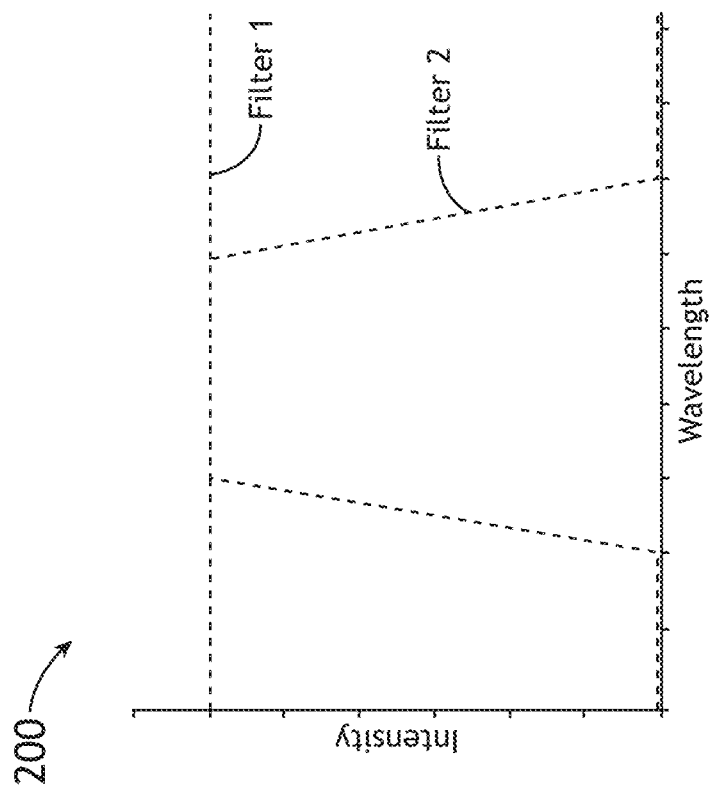
FIG. 2A illustrates a graph of intensity as a function of wavelength of a broadband output as a function of wavelength after filtering with a first filter and a second filter, in accordance with one or more embodiments of the present disclosure.

FIG. 2A illustrates a graph 200 graphing intensity as a function of wavelength after filtering with two separate filters. In one embodiment, Filter 1 may be included in a set of filters located on a first filter unit of a filter assembly 102. In another embodiment, Filter 2 may be included in a second set of filters located on a second filter unit of a filter assembly 102. In one embodiment, as shown in FIG. 2A, Filter 1 is a high-pass filter, only passing illumination above a particular wavelength. In another embodiment, as shown in FIG. 2A, Filter 2 is a low-pass filter, only passing illumination below a particular wavelength.

Figure 2B:
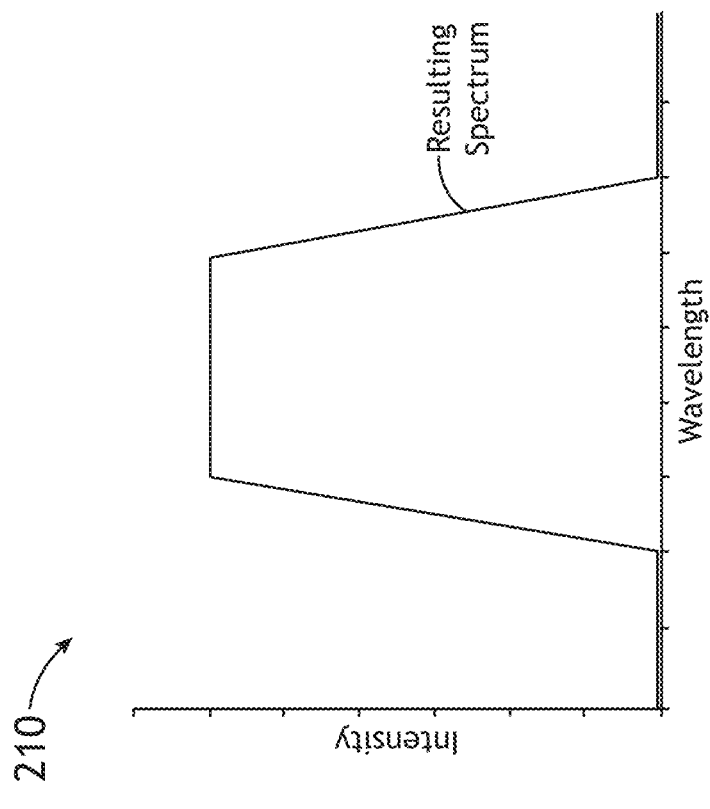
FIG. 2B illustrates a graph of intensity as a function of wavelength of a resulting narrow spectral band, in accordance with one or more embodiments of the present disclosure.

FIG. 2B illustrates a graph 210 depicting the resulting narrow spectral band obtained by system 100 using Filter 1 and Filter 2 from graph 200, in accordance with one embodiment of the present disclosure. As can be seen in graph 210, the resulting spectrum is a product of the high-pass filter (Filter 1) and the low-pass filter (Filter 2) from graph 200.

FIG. 2C illustrates a graph 220 graphing intensity as a function of wavelength after filtering with two separate filters. As shown in FIG. 2C, Filter 1 is a high-pass filter, only passing illumination above a particular wavelength. In another embodiment, as shown in FIG. 2C, Filter 2 is a low-pass filter, only passing illumination below a particular wavelength.

FIG. 2D illustrates a graph 230 depicting the resulting broad spectral band obtained by system 100 using Filter 1 and Filter 2 from graph 220, in accordance with one embodiment of the present disclosure. As can be seen in graph 230, the resulting spectral band is a product of the high-pass filter (Filter 1) and the low-pass filter (Filter 2) from graph 220.

Comparing the resulting spectrums from graphs 230 and 210, it can be seen the set of filters used by system 100 in graph 210 result in a narrower filtered spectral band, whereas the set of filters used by system 100 in graph 230 result in a wider filtered spectral band. It can be appreciated from these graphs, as well as the foregoing disclosure, that the filter assembly 102 is highly customizable, and can be utilized to filter an inspection system to a wide array of spectral ranges.

Figure 4:
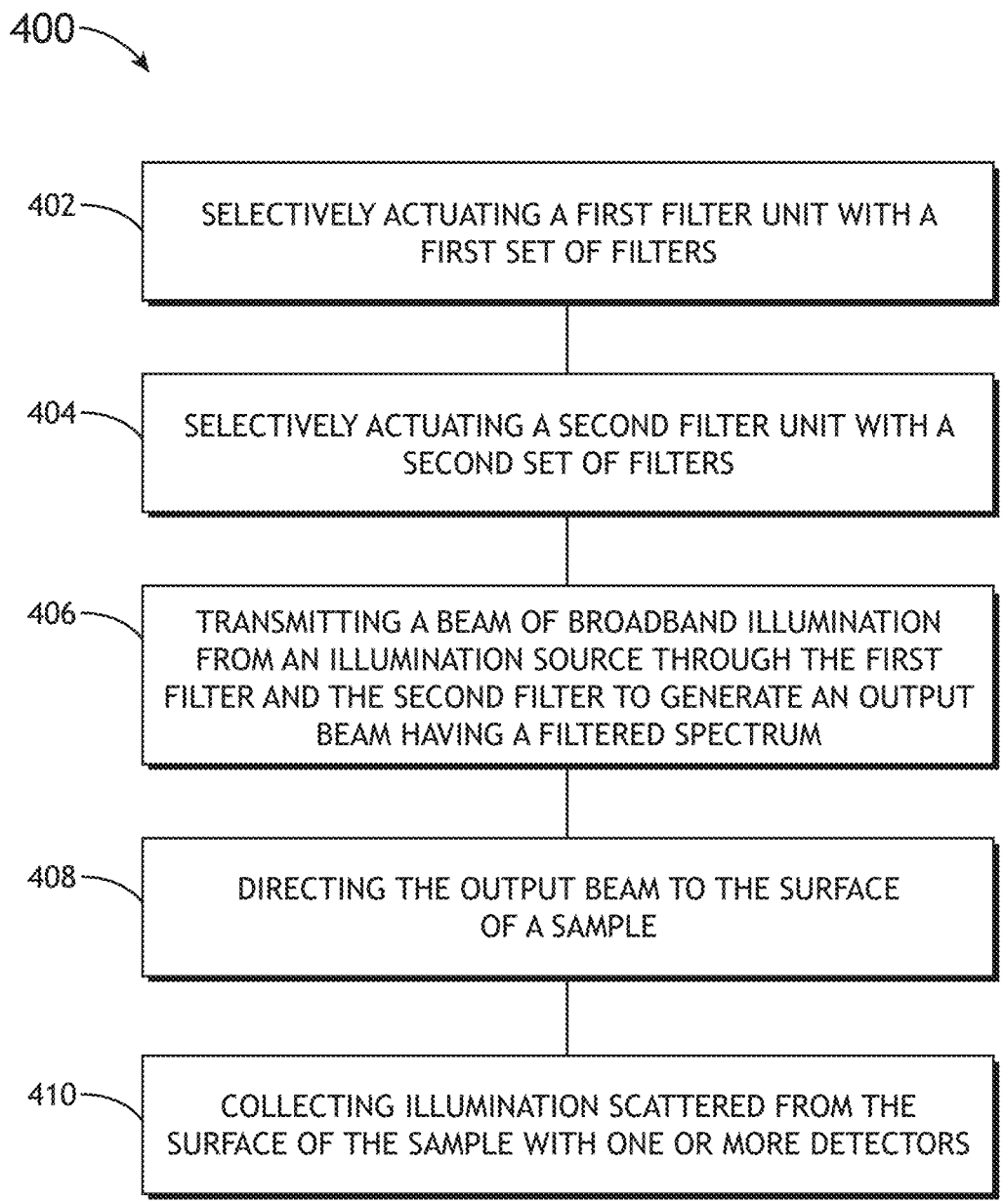
FIG. 4 illustrates a flowchart of a method for providing adjustable spectral capabilities in a broadband inspection system, in accordance with one or more embodiments of the present disclosure.

FIG. 4 illustrates a flowchart of a method 400 for providing adjustable spectral capabilities in a broadband inspection system, in accordance with one or more embodiments of the present disclosure. It is noted herein that the steps of method 400 may be implemented all or in part by system 100. It is further noted, however, that method 400 is not limited to the system 100 in that additional or alternative system-level embodiments may carry out all or part of the steps of method 400.

In step 402, first filter with a first set of filters is selectively actuated. Similarly, in step 404, a second filter with a second set of filters is selectively actuated. In one embodiment, as described herein, a controller 112 may direct a first motor to selectively actuate a first filter unit in order to actuate a particular filter on the first filter unit. Similarly, in another embodiment, the controller 112 may direct a second motor to selectively actuate a second filter unit in order to actuate a particular filter on the second filter unit into the beam of illumination.

In step 406, a beam of broadband illumination from an illumination source is transmitted through the first filter and the second filter to generate an output beam having a filtered spectrum. In step 408, the output beam is directed to the surface of sample. In step 408, illumination scattered from the surface of the sample is collected with one or more detectors.

All of the methods described herein may include storing results of one or more steps of the method embodiments in a storage medium. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc.

It is further contemplated that each of the embodiments of the method described above may include any other step(s) of any other method(s) described herein. In addition, each of the embodiments of the method described above may be performed by any of the systems described herein.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed is:

1. A filter apparatus for providing a filtered spectrum in a broadband inspection system comprising:
    a first filter unit, the first filter unit including a first plurality of filters;
    an additional filter unit, the additional filter unit including an additional plurality of filters, wherein at least one of the first plurality of filters or the additional plurality of filters includes a first filter and a second filter having one or more filtering characteristics different from the first filter, wherein at least some of the optical filters of the first filter unit and at least some of the optical filters of the additional filter unit are optical filters configured to filter out a selected spectral portion of broadband illumination from an illumination source;
    a first motor coupled to the first filter unit, wherein the first motor is configured to selectively actuate a selected filter of the first filter unit into a beam of the broadband illumination from the illumination source; and
    an additional motor coupled to the additional filter unit, wherein the additional motor is configured to selectively actuate a selected filter of the additional filter unit into the beam of broadband illumination, wherein the selected filter of the first filter unit and the selected filter of the additional filter unit are configured to filter broadband illumination from an illumination source to provide a selected filtered spectrum band for broadband inspection; and a controller communicatively coupled to the first motor and the additional motor, wherein the controller includes one or more processors configured to execute a set of program instructions and memory, wherein a first combined spectral configuration and at least one an additional combined spectral configuration are stored in memory, wherein the program instructions are configured to cause the one or more processors to implement at least one of a first combined spectral configuration or the at least an additional combined spectral configuration in response to a user request via a user interface, wherein the first combined spectral configuration or the at least an additional combined spectral configuration includes adjusting a positional state of at least one of the first filter unit or the additional filter unit via at least one of the first motor or additional motor to achieve at least one of the first combined spectral configuration or the at least one of an additional combined spectral configuration, wherein the first combined spectral configuration provides a first spectral range and the additional combined spectral configuration provides an additional spectral range different from the first spectral range, wherein the first spectral range and the additional spectral range are between 10 and 600 nm.

2. The filter apparatus of claim 1, wherein the first plurality of filters includes 5 to 25 filters.

3. The filter apparatus of claim 1, wherein the additional plurality of filters includes 5 to 25 filters.

4. The filter apparatus of claim 1, wherein the first plurality of filters includes at least one of a low pass filter or a high pass filter.

5. The filter apparatus of claim 1, wherein the additional plurality of filters includes at least one of a low pass filter or a high pass filter.

6. A filter wheel apparatus for providing a filtered spectrum in a broadband inspection system comprising:

a first filter wheel, the first filter wheel including a first plurality of filters, an additional filter wheel, the additional filter wheel including an additional plurality of filters, wherein at least one of the first plurality of filters or the additional plurality of filters includes a first filter and a second filter having one or more filtering characteristics different from the first filter, wherein at least some of the optical filters of the first filter wheel and at least some of the optical filters of the additional filter wheel are optical filters configured to filter out a selected spectral portion of broadband illumination from an illumination source;

a first motor coupled to the first filter wheel, wherein the first motor is configured to selectively rotate a selected filter of the first filter wheel into a beam of the broadband illumination from an illumination source; and an additional motor coupled to the additional filter wheel, wherein the additional motor is configured to selectively rotate a selected filter of the additional filter wheel into the beam of broadband illumination, wherein the selected filter of the first filter wheel and the selected filter of the additional filter wheel are configured to filter broadband illumination from an illumination source to provide a selected filtered spectrum band for broadband inspection; and a controller communicatively coupled to the first motor and the additional motor, wherein the controller includes one or more processors configured to execute a set of program instructions and memory, wherein a first combined spectral configuration and at least one an additional combined spectral configuration are stored in memory, wherein the program instructions are configured to cause the one or more processors to implement at least one of a first combined spectral configuration or the at least an additional combined spectral configuration in response to a user request via a user interface, wherein the first combined spectral configuration or the at least an additional combined spectral configuration includes adjusting a positional state of at least one of the first filter unit or the additional filter unit via at least one of the first motor or additional motor to achieve at least one of the first combined spectral configuration or the at least one of an additional combined spectral configuration, wherein the first combined spectral configuration provides a first spectral range and the additional combined spectral configuration provides an additional spectral range different from the first spectral range, wherein the first spectral range and the additional spectral range are between 10 and 600 nm.

7. The filter wheel apparatus of claim 6, wherein the first plurality of filters includes 5 to 25 filters.

8. The filter wheel apparatus of claim 6, wherein the additional plurality of filters includes 5 to 25 filters.

9. The filter wheel apparatus of claim 6, wherein the first plurality of filters includes at least one of a low pass filter or a high pass filter.

10. The filter wheel apparatus of claim 6, wherein the additional plurality of filters includes at least one of a low pass filter or a high pass filter.

11. A system comprising:

an illumination source, the illumination source configured to generate a beam of broadband illumination; and a filter assembly comprising:

a first filter unit including a first plurality of filters;

an additional filter unit including an additional plurality of filters, wherein at least one of the first plurality of filters or the additional plurality of filters includes a first filter and a second filter having one or more filtering characteristics different from the first filter, wherein at least some of the optical filters of the first filter unit and at least some of the optical filters of the additional filter unit are optical filters configured to filter out a selected spectral portion of broadband illumination from an illumination source;

a first motor coupled to the first filter unit, wherein the first motor is configured to selectively actuate a selected filter of the first filter unit into the beam of broadband illumination; and an additional motor coupled to the additional filter unit, wherein the additional motor is configured to selectively actuate a selected filter of the additional filter unit into the beam of broadband illumination, wherein the selected filter of the first filter unit and the selected filter of the additional filter unit are configured to filter the broadband illumination from the illumination source to provide a selected filtered spectrum band for broadband inspection; and a controller communicatively coupled to the first motor and the additional motor, wherein the controller includes one or more processors configured to execute a set of program instructions and memory, wherein a first combined spectral configuration and at least one an additional combined spectral configuration are stored in memory, wherein the program instructions are configured to cause the one or more processors to implement at least one of a first combined spectral configuration or the at least an additional combined spectral configuration in response to a user request via a user interface, wherein the first combined spectral configuration or the at least an additional combined spectral configuration includes adjusting a positional state of at least one of the first filter unit or the additional filter unit via at least one of the first motor or additional motor to achieve at least one of the first combined spectral configuration or the at least one of an additional combined spectral configuration, wherein the first combined spectral configuration provides a first spectral range and the additional combined spectral configuration provides an additional spectral range different from the first spectral range, wherein the first spectral range and the additional spectral range are between 10 and 600 nm.

12. The system of claim 11, wherein the first plurality of filters includes 5 to 25 filters.

13. The system of claim 11, wherein the additional plurality of filters includes 5 to 25 filters.

14. The system of claim 11, wherein the first plurality of filters includes at least one of a low pass filter or a high pass filter.

15. The system of claim 11, wherein the additional plurality of filters includes at least one of a low pass filter or a high pass filter.

16. The system of claim 11, wherein the illumination source configured to emit broadband illumination comprises at least one of a laser sustained plasma (LSP), a discharge broadband source, or a broadband laser.

17. A system comprising:
an illumination source, the illumination source configured to generate a beam of broadband illumination; and
a filter assembly comprising:
a first filter wheel including a first plurality of filters;
an additional filter wheel including an additional plurality of filters, wherein at least one of the first plurality of filters or the additional plurality of filters includes a first filter and a second filter having one or more filtering characteristics different from the first filter, wherein at least some of the optical filters of the first filter unit and at least some of the optical filters of the additional filter unit are optical filters configured to filter out a selected spectral portion of broadband illumination from an illumination source;
a first motor rotationally coupled to the first filter wheel, wherein the first motor is configured to selectively rotate a selected filter of the first filter wheel into the beam of broadband illumination; and
an additional motor rotationally coupled to the additional filter wheel, wherein the additional motor is configured to selectively rotate a selected filter of the additional filter wheel into the beam of broadband illumination, wherein the selected filter of the first filter wheel and the selected filter of the additional filter wheel are configured to filter broadband illumination from the illumination source to provide a selected filtered spectrum band for broadband inspection;
a controller communicatively coupled to the first motor and the additional motor, wherein the controller includes one or more processors configured to execute a set of program instructions and memory, wherein a first combined spectral configuration and at least one an additional combined spectral configuration are stored in memory, wherein the program instructions are configured to cause the one or more processors to implement at least one of a first combined spectral configuration or the at least an additional combined spectral configuration in response to a user request via a user interface, wherein the first combined spectral configuration or the at least an additional combined spectral configuration includes adjusting a positional state of at least one of the first filter unit or the additional filter unit via at least one of the first motor or additional motor to achieve at least one of the first combined spectral configuration or the at least one of an additional combined spectral configuration, wherein the first combined spectral configuration provides a first spectral range and the additional combined spectral configuration provides an additional spectral range different from the first spectral range, wherein the first spectral range and the additional spectral range are between 10 and 600 nm.

18. The system of claim 17, wherein the first plurality of filters includes 5 to 25 filters.

19. The system of claim 17, wherein the additional plurality of filters includes 5 to 25 filters.

20. The system of claim 17, wherein the illumination source is positioned off-axis relative to at least one of the rotational axis of the first wheel or the rotational axis of the second wheel.

21. The system of claim 17, wherein the first plurality of filters includes at least one of a low pass filter or a high pass filter.

22. The system of claim 17, wherein the additional plurality of filters includes at least one of a low pass filter or a high pass filter.

23. The system of claim 17, wherein the illumination source configured to emit broadband illumination comprises at least one of a laser sustained plasma (LSP), a discharge broadband source, or a broadband laser.

* * * * *